US011549621B2

(12) United States Patent
Landis et al.

(10) Patent No.: US 11,549,621 B2
(45) Date of Patent: Jan. 10, 2023

(54) FLUID CONNECTOR

(71) Applicant: Parker-Hannifin Corporation, Cleveland, OH (US)

(72) Inventors: Phillip A. Landis, Hilliard, OH (US); Diane M. Artman, Columbus, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 231 days.

(21) Appl. No.: 15/734,308

(22) PCT Filed: Jun. 5, 2019

(86) PCT No.: PCT/US2019/035578
§ 371 (c)(1),
(2) Date: Dec. 2, 2020

(87) PCT Pub. No.: WO2020/040841
PCT Pub. Date: Feb. 27, 2020

(65) Prior Publication Data
US 2021/0222805 A1 Jul. 22, 2021

Related U.S. Application Data

(60) Provisional application No. 62/720,366, filed on Aug. 21, 2018.

(51) Int. Cl.
*F16L 15/00* (2006.01)
*F16L 15/04* (2006.01)
(Continued)

(52) U.S. Cl.
CPC ........... *F16L 15/003* (2013.01); *F16L 15/004* (2013.01); *F16L 15/04* (2013.01); *F16L 43/02* (2013.01); *F16L 41/03* (2013.01)

(58) Field of Classification Search
CPC ....... F16L 15/008; F16L 15/003; F16L 15/04; F16J 15/3452
(Continued)

(56) References Cited

U.S. PATENT DOCUMENTS 3,074,430 A 1/1963 LaBelle
3,235,224 A * 2/1966 Grove ................... F16K 5/0673
251/327

(Continued)

FOREIGN PATENT DOCUMENTS

DE 298 03 740 U1 5/1998
DE 102014217411 A1 3/2016
(Continued)

OTHER PUBLICATIONS

International Search Report and Written Opinion prepared by the European Patent Office in international application No. PCT/US2019/035578, dated Sep. 17, 2019.
(Continued)

*Primary Examiner* — David Bochna
(74) *Attorney, Agent, or Firm* — McDonnell Boehnen Hulbert & Berghoff LLP

(57) ABSTRACT

An example fitting includes: a fitting body having counterbore, where the counterbore defines an annular shoulder within tire fitting body: a spring having a first end interfacing with the annular shoulder of the counterbore; and a seal carrier having: (i) a first end face interfacing with a second end of the spring, (ii) a second end face configured to interface with an internal surface of a port, such that the spring is configured to apply a biasing force on the seal carrier toward the internal surface of the port, (iii) a first annular groove on an exterior peripheral surface of the seal carrier, where the first annular groove is configured to have a radial seal disposed therein, and (iv) a second annular
(Continued)

groove in the second end face, where the second annular groove is configured to have a face seal disposed therein.

16 Claims, 11 Drawing Sheets

(51) Int. Cl.
  *F16L 43/02* (2006.01)
  *F16L 41/03* (2006.01)

(58) Field of Classification Search
  USPC .................. 285/374, 375, 98, 101, 103
  See application file for complete search history.

(56) References Cited

U.S. PATENT DOCUMENTS

| | | | |
|---|---|---|---|
| 3,240,515 A | | 3/1966 | Schmohl |
| 3,326,518 A | * | 6/1967 | Grove .................. F16K 27/067 |
| | | | 251/309 |
| 3,365,219 A | * | 1/1968 | Nicolaus .............. F16L 19/086 |
| | | | 285/356 |
| 3,678,956 A | * | 7/1972 | Ebin .................... F16K 5/0673 |
| | | | 251/317 |
| 3,727,952 A | * | 4/1973 | Richardson ............. F16L 17/00 |
| | | | 285/322 |
| 3,899,199 A | * | 8/1975 | Garey .................. F16L 21/022 |
| | | | 285/375 |
| 4,465,096 A | | 8/1984 | Voisine |
| 4,477,055 A | * | 10/1984 | Partridge ............. F16K 5/0673 |
| | | | 137/328 |
| 4,765,365 A | | 8/1988 | Roland |
| 4,852,611 A | | 8/1989 | Knerr et al. |
| 4,887,643 A | * | 12/1989 | Tomlin .................. F16K 11/044 |
| | | | 137/625.68 |
| 5,115,550 A | | 5/1992 | Williamson |
| 5,209,528 A | * | 5/1993 | Weh ...................... F16L 37/121 |
| | | | 285/375 |
| 6,045,166 A | | 4/2000 | Krause |
| 6,203,435 B1 | * | 3/2001 | Falgout, Sr. .............. F16D 3/16 |
| | | | 464/11 |
| 6,312,020 B1 | | 11/2001 | Ketcham et al. |
| 7,070,208 B2 | | 7/2006 | Richey et al. |
| 9,476,527 B2 | | 10/2016 | Considine et al. |
| 9,482,379 B2 | | 11/2016 | Trent |
| 9,791,079 B2 | | 10/2017 | Considine, Jr. et al. |
| 9,803,783 B2 | | 10/2017 | Zulauf et al. |
| 2007/0252384 A1 | | 11/2007 | Dickerson et al. |
| 2008/0048440 A1 | | 2/2008 | Anderson et al. |
| 2011/0303593 A1 | | 12/2011 | Reinhardt |
| 2015/0129235 A1 | | 5/2015 | Webb |
| 2016/0273686 A1 | | 9/2016 | Considine, Jr. et al. |
| 2021/0131595 A1 | * | 5/2021 | Patch .................... F16J 15/3452 |

FOREIGN PATENT DOCUMENTS

| | | |
|---|---|---|
| EP | 0 456377 A2 | 11/1991 |
| JP | 3 673309 B2 | 7/2005 |

OTHER PUBLICATIONS

Non-Final Office Action issued by the U.S. Patent Office in U.S. Appl. No. 17/011,089, dated Oct. 7, 2022.

* cited by examiner

FLUID CONNECTOR

CROSS-REFERENCE TO RELATED APPLICATION

This application claims priority to U.S. Provisional Application No. 62/720,366, filed Aug. 21, 2018, which is incorporated herein by reference in its entirety.

BACKGROUND

In many applications, tubes, pipes, and hoses are used to transfer different types of fluids from one location to another. In some applications, several tubes, pipes, and hoses can be used to form a single line and transfer fluids over long distances. In other applications, tubes, pipes, and hoses can be used to transfer fluid to and from a manifold or equipment. The manifold can have a distribution network or can have multiple valves that perform particular fluid flow control functions during operation of a fluid system.

Fittings are used to connect or adapt pipes, tubes, or hoses together to form the single line or to connect manifolds and equipment. In some instances, the manifold or equipment can have threads that engage the corresponding threads of a fitting or adaptor. In examples, these threads can be tapered threads, and the tapered threads are used to create a mechanical seal connection, to create a seal between a fitting with tapered threads and manifolds or equipment. In these examples, a large wrench or power equipment can be used to apply a large torque to tighten the threads. Applying such a large torque by an operator can be challenging. For instance, the fitting can be disposed at a tight space where inserting a wrench is difficult. Further, applying such large torques can lead to operator fatigue.

Further, galling of the threads can occur with the application of large forces and the inherent nature of the mechanical metal to metal seal of tapered threads. Galling occurs as a result of friction between the threads of the fitting and corresponding threads in the manifold or equipment. Such friction can cause cold- or friction-welding. When the fitting has cold- or friction-welded, it might not be possible to remove the fitting from the manifold or equipment, thereby causing rework or replacement.

During operation of a fluid system, pressure and or vibration in the tubes, pipes, or hoses can cause the fitting to rotate, thereby loosening the threaded connection between the fitting and the mating tube, pipe, hose, manifold or equipment. With a loose connection, fluid leakage can occur at the fitting, thereby leading to efficiency loss or loss of primary function of the system that includes the fitting.

Therefore, it may be desirable to have a fitting or fluid connector that can reduce the level of torque applied to seal a fluid connection and also preclude or limit galling. It is with respect to these and other considerations that the disclosure made herein is presented.

SUMMARY

The present disclosure describes implementations that relate to a fluid connector.

In a first example implementation, the present disclosure describes a fitting. The fitting includes: (i) a fitting body having counterbore formed therein, wherein the counterbore defines an annular shoulder within the fitting body; (ii) a spring having a first end interfacing with the annular shoulder of the counterbore: and (iii) a seal carrier having: (a) a first end face interfacing with a second end of the spring, (b) a second end face configured to interface with an internal surface of a port, such that the spring is configured to apply a biasing force on the seal carrier toward the internal surface of the port, (c) a first annular groove on an exterior peripheral surface of the seal carrier, wherein the first annular groove is configured to have a radial seal disposed therein, and (d) a second annular groove in the second end face, wherein the second annular groove is configured to have a face seal disposed therein.

In a second example implementation, the present disclosure describes an assembly. The assembly includes a port comprising a port body, wherein the port body has first counterbore formed therein, wherein the first counterbore defines a first annular shoulder within the port body, and wherein the port body includes internal threads disposed on an interior peripheral surface of the port body. The assembly also includes a fitting. The fitting includes: (i) a fitting body having a second counterbore formed therein, wherein the second counterbore defines a second annular shoulder within the fitting body, wherein the fitting body includes external threads disposed on an exterior peripheral surface of the fitting body configured to threadedly engage the internal threads of the port body to couple the fitting to the port; (ii) a spring having a first end interfacing with the second annular shoulder of the second counterbore; and (iii) a seal carrier having: (a) a first end face interfacing with a second end of the spring, (b) a second end face configured to interface with the first annular shoulder of the port body, such that the spring is configured to apply a biasing force on the seal carrier toward the first annular shoulder of the port body, (c) a first annular groove on a respective exterior peripheral surface of the seal carrier, wherein the first annular groove includes a radial seal disposed therein between the seal carrier and a respective interior peripheral surface of the fitting body, and (d) a second annular groove in the second end face, wherein the second annular groove includes a face seal disposed therein between the second end face of the seal carrier and the first annular shoulder of the port body.

In a third example implementation, the present disclosure describes a fluid system. The fluid system includes a manifold having a port comprising a first counterbore formed therein, wherein the first counterbore defines a first annular shoulder within the port, and wherein the port includes internal threads disposed on an interior peripheral surface of the port. The fluid system also includes a fluid line and a fitting having a first end coupled to the fluid line and a second end coupled to the port, such that fitting fluidly couples the fluid line to the manifold. The fitting includes: (i) a fitting body having a second counterbore formed therein, wherein the second counterbore defines a second annular shoulder within the fitting body, wherein the fitting body includes external threads disposed on an exterior peripheral surface of the fitting body configured to threadedly engage the internal threads of the port to couple the fitting to the port; (ii) a spring having a first end interfacing with the second annular shoulder of the second counterbore; and (iii) a seal carrier having: (a) a first end face interfacing with a second end of the spring, (b) a second end face configured to interface with the first annular shoulder of the port, such that the spring is configured to apply a biasing force on the seal carrier toward the first annular shoulder of the port, (c) a first annular groove on a respective exterior peripheral surface of the seal carrier, wherein the first annular groove includes a radial seal disposed therein between the seal carrier and a respective interior peripheral surface of the fitting body, and (d) a second annular groove in the second end face, wherein the second annular groove includes a face seal disposed therein between the second end face of the seal carrier and the first annular shoulder of the port.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1A:
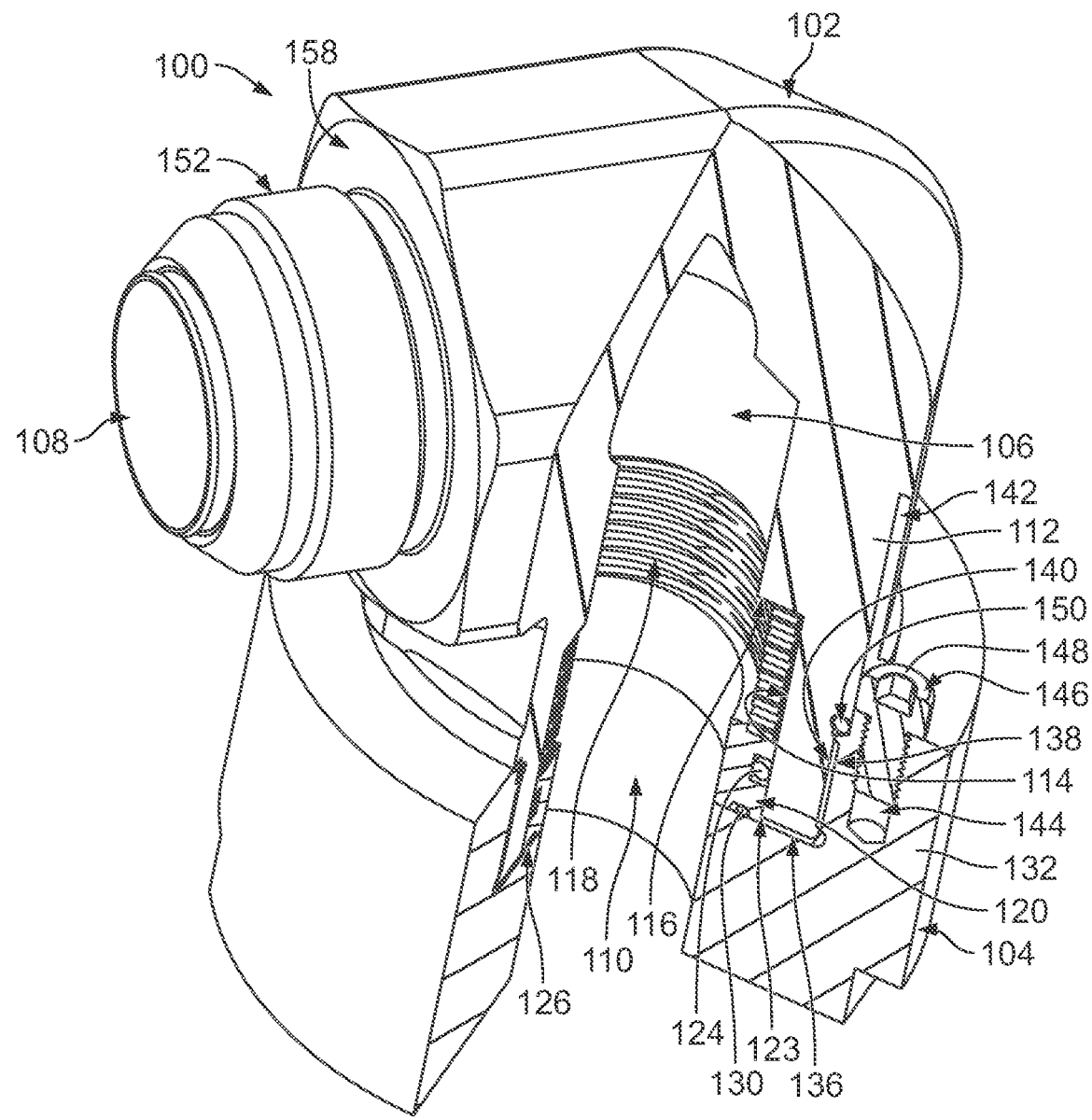
FIG. 1A illustrates a prospective partial cross-sectional view of an assembly of a fitting and a port, in accordance with an example implementation.

A fitting is used in pipe systems to connect pipes, tubes, or hoses, or to couple pipes or hoses to a manifold or equipment or to couple other pipes, tubes, or hoses together.

The term "fluid" is used herein as including any gas or liquid. The term "fluid line" is used here to encompass a pipe, tube, or hose.

Fittings have several types and shapes. For example, an elbow fitting is installed between two lengths of pipe (or tubing) to allow a change of direction, e.g., usually a 90° or 45° angle. Ends of an elbow fitting can be machined for butt welding, threaded (e.g., female threads), or socketed. When the ends differ in size, the elbow fitting can be referred to as a reducing (or reducer) elbow fitting. A coupling fitting is configured to connect two pipes. If sizes of the pipes differ, the fitting is known as a reducing coupling, reducer, or an adapter. Other types of fittings include union fittings, nipple fittings, reducer fitting, double-tapped bushing fitting, tee fitting, diverter fitting, as examples.

When installing a piping or plumbing system, it is desirable to have fittings that are leak-proof and make reliable connections. Several connection methods can be used to couple fluid lines to a fitting include welding and threading. In examples, threads are used to make a connection that can withstand high pressure levels. In these examples, a threaded pipe can have a screw thread at one or both ends for assembly. For instance, a steel pipe can be joined with threaded connections where tapered threads are cut or machined into the end of the fitting, then a sealant is applied in the form of thread-sealing compound or thread seal tape and the fitting is threaded into a manifold or equipment with a wrench. Tapered threads are used in high pressure application because tapered threads create a seal due to the thread crest to root interference, assisted by the thread seal tape. In contrast, parallel threads include connecting surfaces that are flat-machined, and a sealing ring is used between the fitting and the fluid line.

In example applications where high pressure fluids are being transferred through fluid lines, connecting these fluid lines with fittings can involve tightening the threads of the fitting with a high torque applied with a pipe wrench or power equipment. For example, for a fitting having 1.5-2 inch diameter, torques of 200-500 pound-force (lbs-ft) can be applied to make a tight threaded connection and achieve a leak-proof connection. Such high torques can be difficult to achieve manually, and in some application where the fitting is disposed in tight spaces, it may be difficult to insert a wrench in such tight spaces to tighten the fitting.

Further, relying on a tight threaded connection to preclude or limit leakage can cause some performance deterioration overtime. For instance, if the fitting is used in a high pressure application or if the fitting and the fluid lines are subjected to vibrations during operation, "hose kicking" can occur, where the fitting can rotate, thereby loosening the threaded connection between the fitting and the fluid lines the fitting is connecting together. As a result of such loosening, galling can occur as the thread surfaces of the fitting and respective thread surface of the fluid lines slide relative to each other.

Galling is a form of wear caused by adhesion between sliding surfaces of the threads of the fitting and corresponding threads of the fluid lines. When a material galls, some of it is pulled with the contacting surface, especially if there is a large amount of force compressing the surfaces together. Galling is caused by a combination of friction and adhesion between the thread surfaces, followed by slipping and tearing of crystal structure beneath the surface. Such friction, adhesion, slipping, and tearing can cause some material to be stuck or friction-welded to an adjacent surface, whereas the galled material may appear gouged with balled-up or torn lumps of material stuck to its surface. Thus, galling involves a transfer of material as it is adhesively pulled from one surface of the fitting or fluid line, leaving the material stuck to the other in the form of a raised lump referred to as "gall."

Galling can cause the threads to seize and tear free from either the fitting or the fluid line. Such seizing or tearing can cause a leakage point at the connection between the fitting and the fluid line, thereby leading to fluid leakage at the connection. In some cases, the fitting may lock up, leading to breakage of the fitting or the tool turning it. Some materials are more prone to galling than other materials. For instance, stainless steel fittings are used in subsea applications to preclude corrosion; however, stainless steel is more prone to galling compared to hardened steel, brass, or bronze alloys, for example.

Galling can particularly occur when tapered threads are used due to the wedged shape of the threads that create a seal. While parallel threads can reduce the likelihood of galling, parallel threads might not seal as well as tapered threads and might not be capable of precluding leakage, particularly in high pressure applications.

Therefore, it may desirable, to have a fitting that precludes leakage without relying on the threaded connection of the fitting with the fluid line or the particular torque level used to tighten threads of the fitting. As such, lower tightening torques can be used, and therefore the likelihood of galling can be reduced. Further, because preventing leakage does not rely on the threaded connection between the fitting and the fluid line, parallel threads, as opposed to tapered threads, can be used, thereby further reducing the likelihood of galling.

FIG. 1A illustrates a prospective partial cross-sectional view of an assembly 100 of a fitting 102 and a port 104, in accordance with an example implementation. The fitting 102 is illustrated as a 90° elbow for illustration only. The description of the fitting 102 is applicable to other fitting configurations (e.g., a straight fitting or a T-fitting).

The fitting 102 has a fluid passage 106 that fluidly couples a first end 108 of the fitting 102 to a second end 110 of the fitting 102. The fitting 102 has a fitting body 112 that defines the fluid passage 106 therein. The fluid passage 106 is defined as a longitudinal cylindrical cavity within the fitting body 112.

Figure 1B:
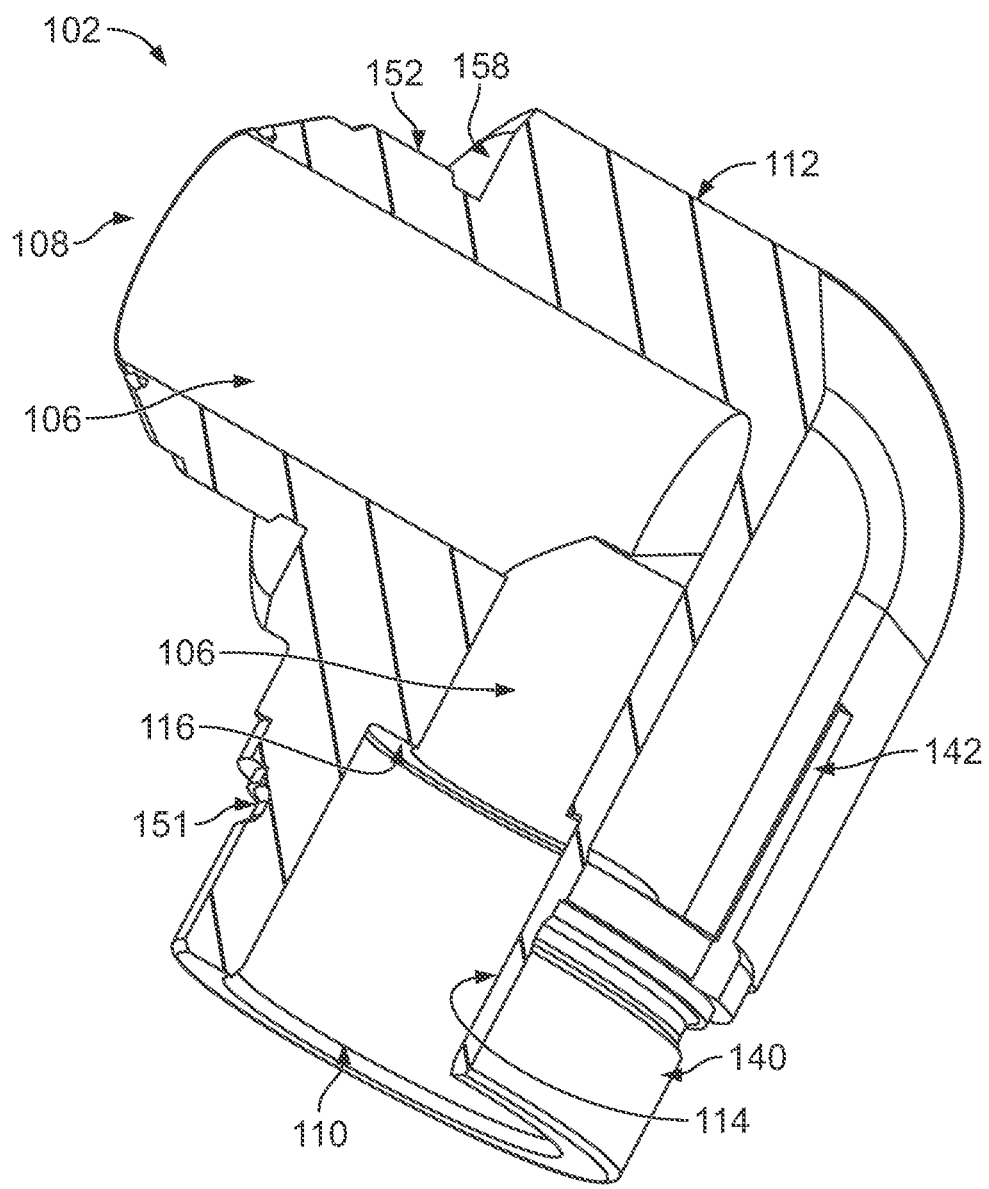
FIG. 1B illustrates a perspective partial cross-sectional view of a fitting body, in accordance with an example implementation.

FIG. 1B illustrates a perspective partial cross-sectional view of the fitting body 112, in accordance with an example implementation. The fitting body 112 includes a counterbore 114 that forms an annular shoulder 116. In other words, the annular shoulder 116 is formed as a protrusion from an interior peripheral surface of the fitting body 112.

Referring back to FIG. 1, the fitting 102 further includes a spring 118 that has a first end that securely engages or rests against the annular shoulder 116 of the fitting body 112. The fitting 102 also includes a seal carrier 120. The spring 118 has coils or outer spring elements that form a central flow passageway that is part of the fluid passage 106 within the fitting body 112.

The seal carrier 120 can be cylindrical in shape and defines therein a respective longitudinal cylindrical cavity that aligns with the longitudinal cylindrical cavity of the fitting body 112 to form the fluid passage 106. A second end of the spring 118 securely engages or rests against a first end of the seal carrier 120. A second end of the seal carrier 120 rests against an interior surface of the port 104 as described below. With this configuration, the spring 118 applies a biasing force on the seal carrier 120 that causes the seal carrier 120 to be biased toward the interior surface of the port 104.

Figure 2:
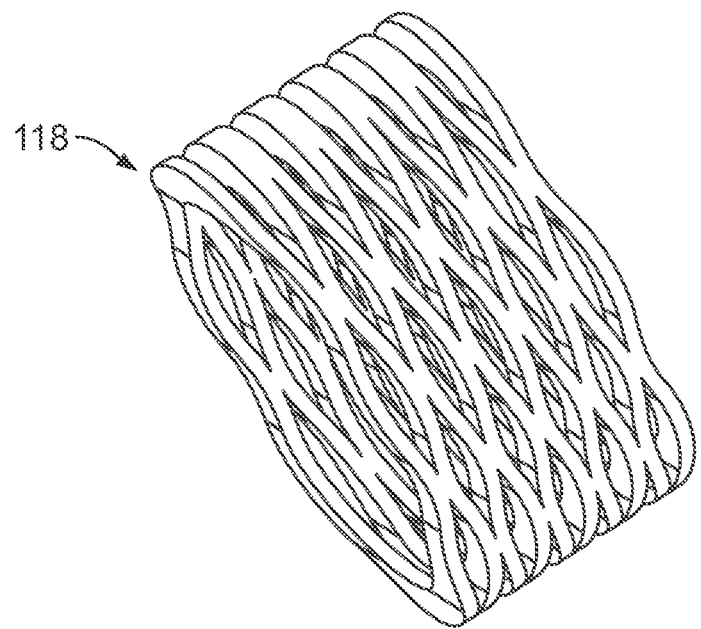
FIG. 2 illustrates a perspective view of a spring, in accordance with an example implementation.
Figure 3:
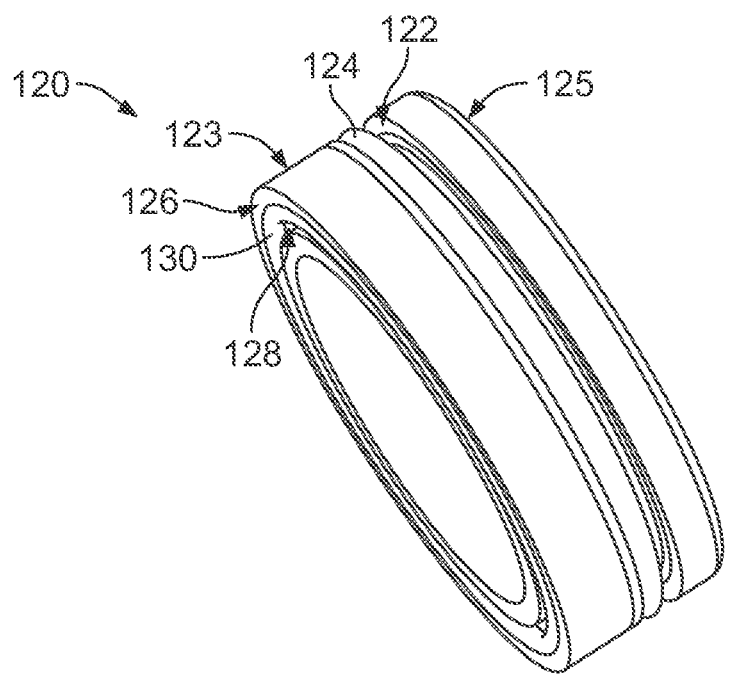
FIG. 3 illustrates a perspective view of a seal carrier, in accordance with an example implementation.
Figure 4:
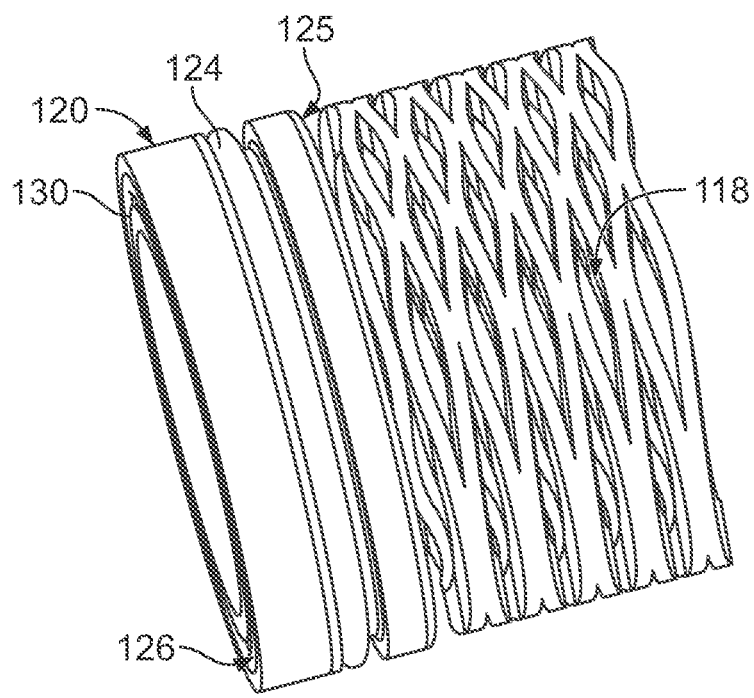
FIG. 4 illustrates a spring interfacing with a seal carrier, in accordance with an example implementation.

FIG. 2 illustrates a perspective view of the spring 118, FIG. 3 illustrates a perspective view of the seal carrier 120, and FIG. 4 illustrates the spring 118 interfacing with the seal carrier 120, in accordance with example implementations. The spring 118 is illustrated in the Figures as a wave spring as an example for illustration; however, other spring types (e.g., a coil spring) can be used as well.

Referring to FIG. 3, the seal carrier 120 has a first annular groove 122 disposed in an exterior peripheral surface 123 of the seal carrier 120. The first annular groove 122 is configured to receive a radial seal 124 (e.g., an O-ring) therein. The seal carrier 120 also includes a first end face 125, against which the second end of the spring 118 rests, and a second end face 126 opposite the first end face 125. The second end face 126 is configured to interface with the interior surface of the port 104. Further, the second end face 126 of the seal carrier 120 defines or includes a second annular groove 128 configured to receive a face seal 130 therein.

Figure 5:
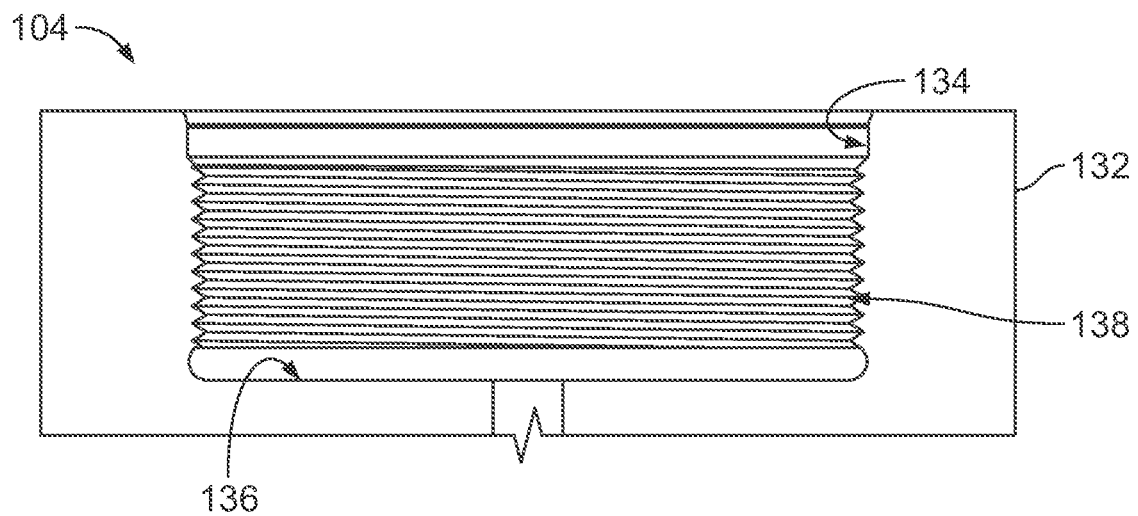
FIG. 5 illustrates a cross-sectional view of a port, in accordance with an example implementation.

FIG. 5 illustrates a cross-sectional view of the port 104, in accordance with an example implementation. The port 104 has a port body 132 that is cylindrical in shape and defines a longitudinal cylindrical cavity that aligns with the fluid passage 106. The port 104 can be part of or integrated into a manifold or can be part of or integrated into an end of a fluid line (e.g., a pipe or hose).

The port body 132 defines or includes a counterbore 134 that forms an annular shoulder 136. In other words, the annular shoulder 136 is formed as a protrusion from an interior peripheral surface of the port body 132. A surface of the annular shoulder 136 operates as a sealing surface with which the second end face 126 of the seal carrier 120 interfaces. The port body 132 further includes internal threads 138 formed on an interior peripheral surface of the counterbore 134.

Referring back to FIG. 1, the fitting body 112 includes external threads 140 formed or disposed on an exterior peripheral surface of the fitting body 112 at the second end 110 of the fitting 102. The external threads 140 of the fitting body 112 are configured to threadedly engage with the internal threads 138 of the counterbore 134 of the port body 132 so as to couple the fitting 102 to the port 104.

As depicted in FIG. 1, the radial seal 124 is disposed between the interior peripheral surface of the counterbore 114 and the exterior peripheral surface 123 of the seal carrier 120. Pressurized fluid flow through the fluid passage 106 squeezes or applies compression on an outside diameter and an inside diameter of the radial seal 124. The radial seal 124 seals an annular space between the interior peripheral surface of the counterbore 114 and the exterior peripheral surface 123 of the seal carrier 120. As such, fluid flowing through the fluid passage 106 does not leak through the annular space between the interior peripheral surface of the counterbore 114 and the exterior peripheral surface 123 of the seal carrier 120 to an external environment of the fitting 102 or the assembly 100. The radial seal 124 can be configured as a dynamic seal to maintain an effective seal if the seal carrier 120 moves longitudinally within the counterbore 114.

The spring 118 applies its biasing force on the seal carrier 120 toward the annular shoulder 136 of the port 104. As a result, the face seal 130 has squeeze or compression applied to the top and bottom surfaces of its cross sections. Thus, sealing surfaces of the face seal 130 are normal to a longitudinal axis of the face seal 130 and seal carrier 120. The face seal 130 is thus configured to prevent leakage in the radial direction through the space between the second end face 126 of the seal carrier 120 and the annular shoulder 136 of the port 104. As such, fluid flowing through the fluid passage 106 does not leak through the space between the second end face 126 of the seal carrier 120 and the annular shoulder 136 of the port 104 to an external environment of the fitting 102 or the assembly 100. The face seal 130 could include any type of face seal such as O-ring, E-ring, C-ring, gasket, end-face mechanical seal, floating seal, due-cone seal, toric seal, etc.

Referring now to FIGS. 1A and 3 together, forces acting on the first end face 125 of the seal carrier 120 include the biasing force of the spring 118 and force applied on an effective annular surface area $A_1$ of the first end face 125 by pressurized fluid flowing through the fitting 102 and communicated to the first end face 125. These forces act on the seal carrier 120 in a distal direction toward the second end 110 of the fitting 102 (e.g., downward in FIG. 1). Pressurized fluid in the space between the second end face 126 of the seal carrier 120 and the annular shoulder 136 of the port 104 applies a force on an effective annular surface area $A_2$ of the second end face 126 of the seal carrier 120 in an opposite direction (e.g., in a proximal or upward direction in FIG. 1). The term "effective annular surface area" is used herein to mean a portion of the surface area on which the fluid acts.

The seal carrier 120 is configured such that the effective annular surface area $A_1$ on which pressurized fluid acts in the distal direction is larger than the annular surface area $A_2$ on which pressurized fluid acts in the proximal direction due to the presence of the face seal 130 in the annular groove 128 disposed in the second end face 126 of the seal carrier 120. Assuming that the pressurized fluid has a pressure level "P," then the force acting on the effective annular surface area $A_1$ is $F_1 = P \cdot A_1$, whereas the force acting on the effective annular surface area $A_2$ is $F_2 = P \cdot A_2$. Because $A_1 > A_2$, then $F_1 > F_2$.

As a result, the pressurized fluid flowing through the fitting 102 applies a differential or net force on the seal carrier 120 toward the annular shoulder 136 of the port 104. The net force applied to the seal carrier 120 maintains and effective sealing contact between the second end face 126 and the annular shoulder 136, thereby facilitating sealing effectiveness of the face seal 130. The radial seal 124 acts as another or an added sealing element to preclude leakage to the external environment of the assembly 100. If the pressure level P of the fluid flowing through the assembly 100 is low, thus rendering the forces $F_1$ and $F_2$ or the difference therebetween small or negligible, the biasing force of the spring 118 ensures that the seal carrier 120 is pushed toward the annular shoulder 136 to maintain effectiveness of the face seal 130.

With this configuration, effective sealing by the face seal 130 is maintained whether the pressure level P is low or high. Particularly, at a low fluid pressure level, the spring 118 maintains effectiveness of sealing by the face seal 130, whereas at a high fluid pressure level both the net force applied by the pressurized fluid and the biasing force of the spring 118 on the seal carrier 120 maintain effective sealing by the by the face seal 130.

Further, with this configuration, as opposed to existing fitting configuration, effective sealing is not maintained by threaded engagement between the external threads 140 of the fitting body 112 and the internal threads 138 of the port body 132. Regardless of the torque level applied to engage the external threads 140 with the internal threads 138 to tighten the threaded engagement therebetween, effective sealing is maintained by the spring 118 and the net force of the pressurized fluid.

As such, engagement of the external threads 140 with the internal threads 138 to couple the fitting 102 to the port 104 can be effective via hand-tightening, rather than applying a large torque as is the case with conventional fittings, which rely on the applied torque to make a sealed connection. Further, the likelihood of galling is reduced because the threads are not tightened to high torque levels. Also, because the engagement of the external threads 140 with the internal threads 138 is not relied on for sealing, parallel threads could be used, rather than tapered threads. As such, the likelihood of galling is further reduced.

Referring back to FIG. 1, in examples, the assembly 100 can be configured to prevent hose-kicking, i.e., to prevent rotation of the fitting 102 relative to the port 104 during operation. Particularly, the fitting body 112 can include a longitudinal groove 142 disposed in the exterior surface of the fitting body 112. The port body 132 includes a threaded hole 144 configured to receive and threadedly engage a locking pin or locking screw 146 therein. The locking screw 146 has screw head 148 that is configured to be partially disposed in the longitudinal groove 142. This configuration allows the locking screw 146 to be screwed in the threaded hole 144 without interference with the longitudinal groove 142. Further, the screw head 148 interfaces and interacts with internal and side walls of the longitudinal groove 142. As such, if under pressure from fluid flowing through the fitting 102, the fitting 102 tends to rotate relative to the port 104, the fitting 102 is precluded from rotating by virtue of the locking screw 146 being fixedly disposed in the threaded hole 144 and blocking the fitting 102 from rotating via interacting with side walls of the longitudinal groove 142.

In examples, the assembly 100 can be used in subsea applications where the assembly 100 (e.g., the fitting 102 and the port 104) is immersed in sea water. To preclude seepage or ingression of sea water to within the assembly 100, the assembly 100 can include an ingression seal 150. The ingression seal 150 is positioned in an annular groove 151 disposed in an exterior peripheral surface of the fitting body 112 as shown in FIG. 1A. Referring to FIGS. 1A and 1B together, the annular groove 151 is disposed above the external threads 140 of the fitting body 112 and the internal threads 138 of the port body 132. With this configuration, the ingression seal 150 can preclude sea water from entering internal spaces of the assembly 100.

In examples, the first end 108 of the fitting 102 can be configured similar to the second end 110. In other words, the assembly 100 can include another seal carrier similar to the seal carrier 120, a spring similar to the spring 118, and a port similar to the port 104 disposed at the first end 108. In other examples, the first end 108 can be configured to couple the fitting 102 to a fluid line such as a pipe or a hose. In these examples, the first end 108 can be configured to have a male thread portion 152 (threads not shown) as depicted in FIG. 1A for engagement with an end of a fluid line.

Figure 6:
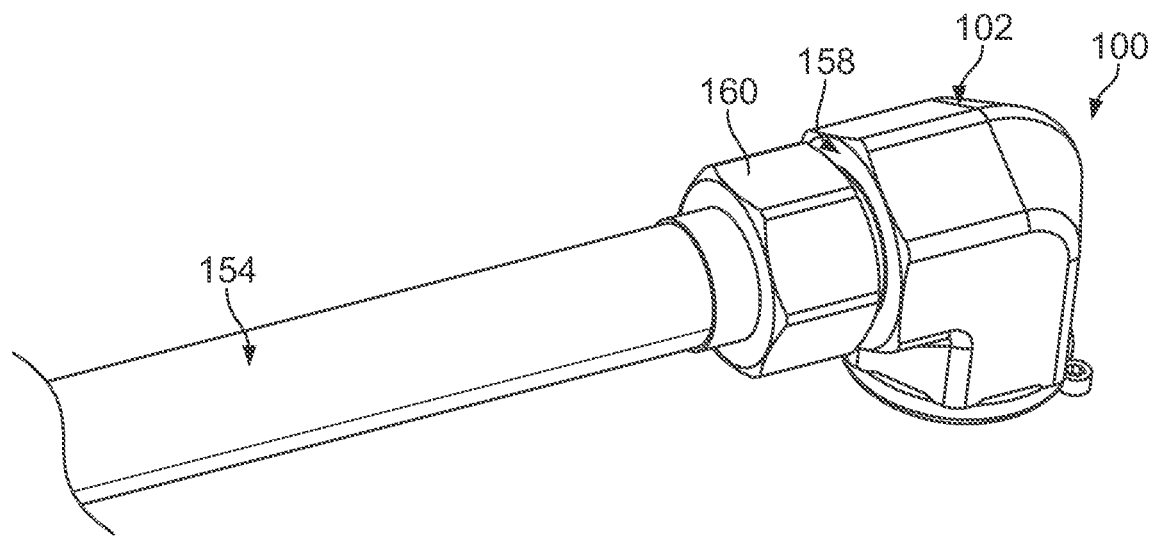
FIG. 6 illustrates a fitting coupled to a pipe, in accordance with an example implementation.
Figure 7:
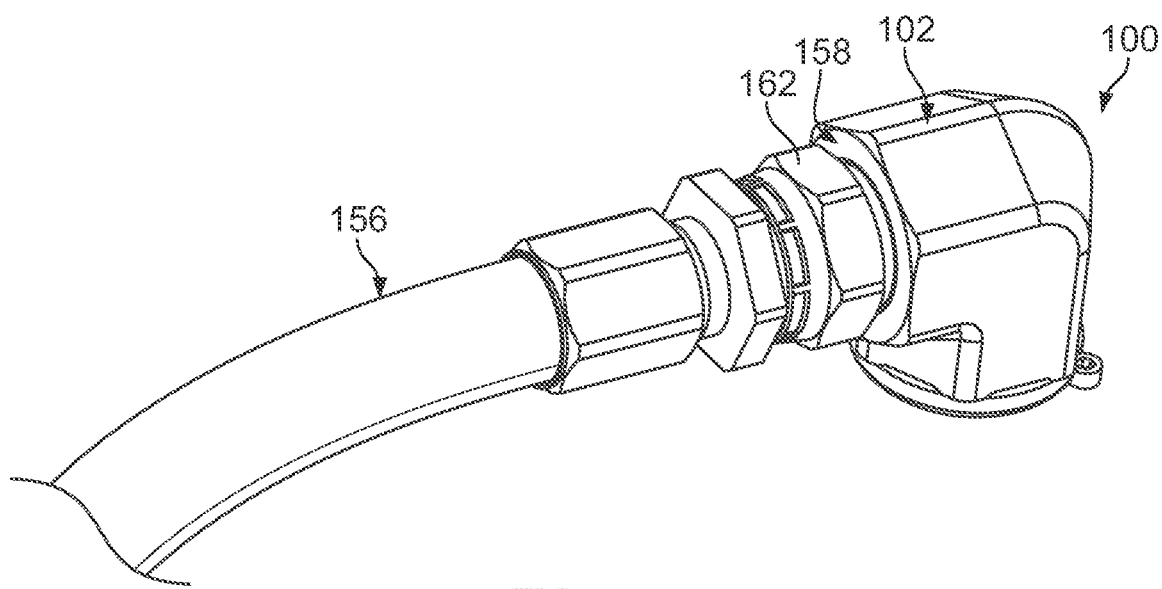
FIG. 7 illustrates a fitting coupled to a flexible hose, in accordance with an example implementation.

FIG. 6 illustrates the fitting 102 coupled to a pipe 154, and FIG. 7 illustrates the fitting 102 coupled to a flexible hose 156, in accordance with example implementations. Referring to FIG. 6, the pipe 154 is butted against an end face 158 of the first end 108 of the fitting 102. A pipe nut 160 can have internal threads that engage with external threads of the male thread portion 152 of the first end 108 to secure the pipe 154 to the fitting 102. An O-ring (not shown) can be disposed at the connection between the pipe nut 160 and the male thread portion 152 to seal the connection.

Similarly, referring to FIG. 7, the flexible hose 156 is butted against the end face 158 of the first end 108 of the fitting 102. A hose nut 162 can have internal threads that engage with external threads of the male thread portion 152 of the first end 108 to secure the flexible hose 156 to the fitting 102. An O-ring (not shown) can be disposed at the connection between the hose nut 162 and the male thread portion 152 to seal the connection.

The fitting 102 can be made available in different sizes and shapes to suit a wide variety of applications. For example, as shown in FIGS. 1A-7, the fitting 102 can be configured as a 90° elbow. In an example, the flexible hose 156 or the pipe 154 can be directed toward the fitting 102 from different angles. In an example, to facilitate coupling the fitting 102 to the flexible hose 156 or the pipe 154 regardless of the angle from which the flexible hose 156 or the pipe 154 is provided to the fitting 102, the fitting 102 can be connected to a swivel mechanism. In other examples, the fitting 102 can be configured such that the fitting 102 can be turned back at least 1 turn from full threaded engagement with the port 104 to change orientation of the first end 108.

Figure 8:
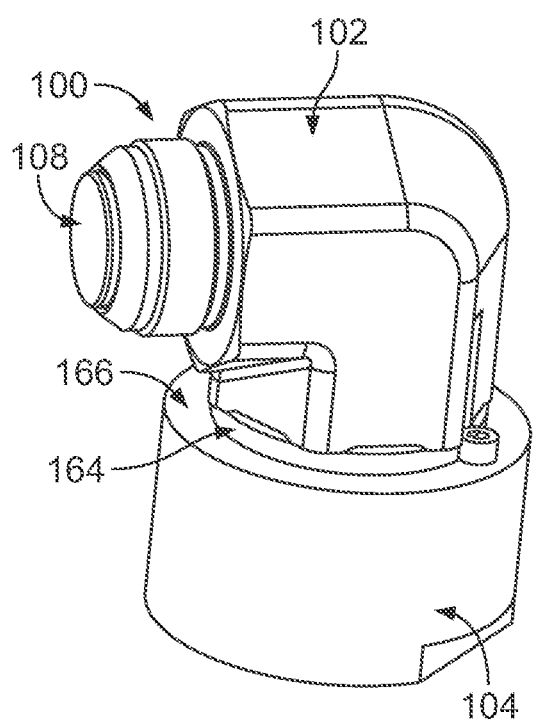
FIG. 8 illustrates a fitting fully threaded into a port, in accordance with an example implementation.
Figure 9:
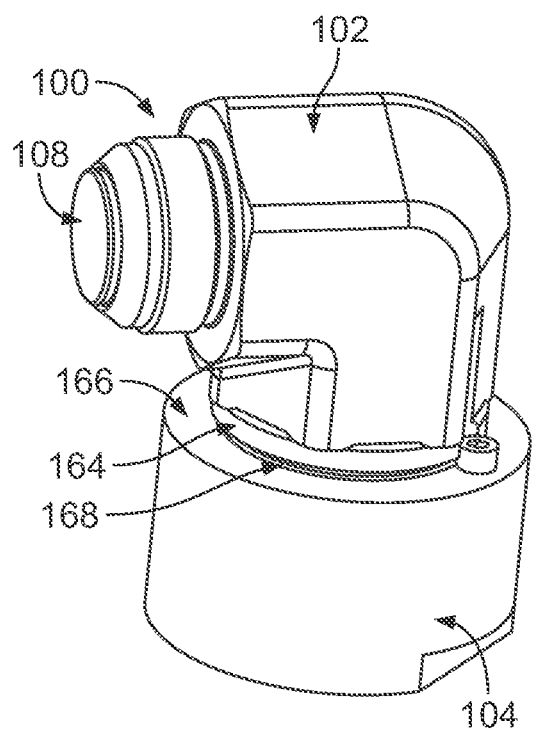
FIG. 9 illustrates a fitting turned back from full engagement with a port to change orientation of a first end of the fitting while allowing for an assembly of the fitting and the port to operate, in accordance with an example implementation.
Figure 10:
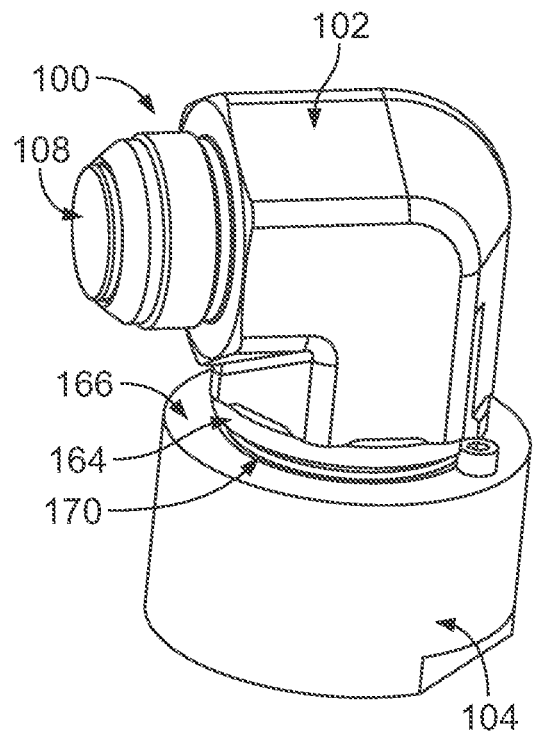
FIG. 10 illustrates providing a visual indication to determine whether a fitting has turned back to an extent precluding sealing of an assembly of the fitting and a port, in accordance with an example implementation.

FIG. 8 illustrates the fitting 102 fully threaded into the port 104, FIG. 9 illustrates the fitting 102 turned back from full engagement with the port 104 to change orientation of the first end 108 while allowing for the assembly 100 to operate, and FIG. 10 illustrates providing a visual indication to determine whether the fitting 102 has turned back to an extent precluding scaling of the assembly 100, in accordance with example implementations. As shown in FIGS. 8-10, the fitting 102 can have a flange 164 protruding from an external peripheral surface of the fitting body 112. When the fitting 102 is fully threaded into the port 104 (e.g., the fitting 102 is screwed all the way in the internal threads 138 of the port 104), the flange 164 sits flush with a proximal surface 166 of the port 104.

To change orientation of the first end 108 of the fitting 102 to match a direction from which the pipe 154 or the flexible hose 156 is provided, the fitting can be unscrewed by one to one and half turn to afford rotating the fitting 102 by up to 360° toward the pipe 154 or the flexible hose 156. Particularly, a depth of the counterbore 134 of the port 104 can be sufficiently large to include more internal threads 138 than the external threads 140 of the fitting 102. As such, the fitting 102 can be backed-up by a turn or more while the external threads 140 remain threadedly engaged with the internal threads 138, for example.

The assembly 100 can be configured such that a measurement of a gap between the flange 164 and the proximal surface 166 indicates whether the fitting 102 has been unscrewed far enough to affect operation of the assembly 100. As shown in FIG. 9, a gap 168 can be measured (e.g., by feeler gauge) or can be used to visually estimate the size of the gap 168 to determine whether the gap 168 is larger than a threshold gap. If the gap 168 is larger than the threshold gap, then the fitting 102 has turned back more than allowed, and leakage can occur. The magnitude or size of the gap 168 is determined by thread pitch of the threads 138, 140. As an example, for 16 pitch threads, each turn of the fitting 102 causes 0.0625 inches linear translation or gap. Thus, in this example, the threshold gap can be about 0.0625 inches (one turn) or 0.09375 inches (one and half turns).

In addition to measuring or estimating the gap 168, the assembly 100 can include a colored ring 170 (e.g., a ring colored orange or red) in the place of the ingression seal 150 described above. In other examples, the ingression seal 150 can be colored with a particular color or a colored ring is used in addition to the ingression seal 150. The assembly 100 can also be configured such that if the fitting 102 is turned back more than an allowed or threshold angle (e.g., more than 1.5 turns), the colored ring 170 becomes visible, and thus provides a visible indication that the fitting 102 has been turned back more than allowed. An operator may then turn the fitting 102 in until the colored ring is not visible to ensure operation of the assembly 100 without leakage.

In examples, the port 104 can be integrated or built into a fluid line (e.g., pipe, tube, or hose) and the fitting 102 can be coupled to the port 104 to couple the fluid line to another fluid line configured to couple to the first end 108 of the fitting 102. In other examples, the port 104 (or multiple ports similar to the port 104) can be integrated, built, or machined into a manifold. The second end 110 of the fitting 102 can be coupled to the port 104 and the first end 108 of the fitting 102 can be coupled to a fluid line. As, such the fitting 102 can fluidly couple the fluid line to the manifold.

Several types of manifolds can be used. For example, flow distribution manifolds are used in many industrial processes and mobile machinery to distribute fluid received from one or more fluid lines into several fluid streams provided to different components or subsystems of a fluid system (e.g., a hydraulic system). Flow distribution manifolds can, for example, be categorized based on the function that the manifold performs into one of the following types: dividing, combining, Z-type and U-type manifolds. Other manifolds can be configured as blocks housing multiple valves and components to control fluid flow and fluid paths to other components and actuators of a fluid system.

Figure 11:
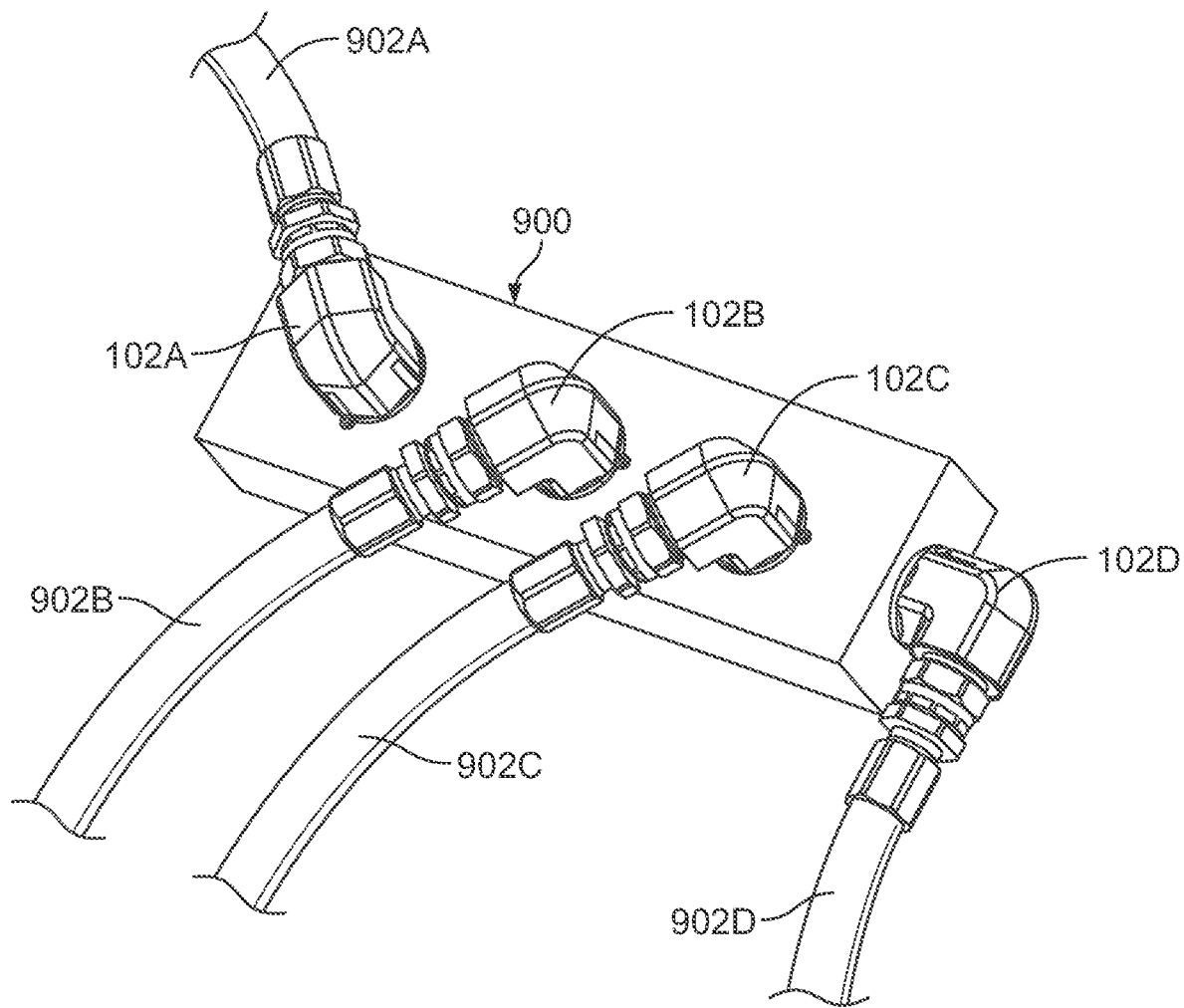
FIG. 11 illustrates multiple fluid lines coupled to a junction manifold, in accordance with an example implementation.
Figure 12:
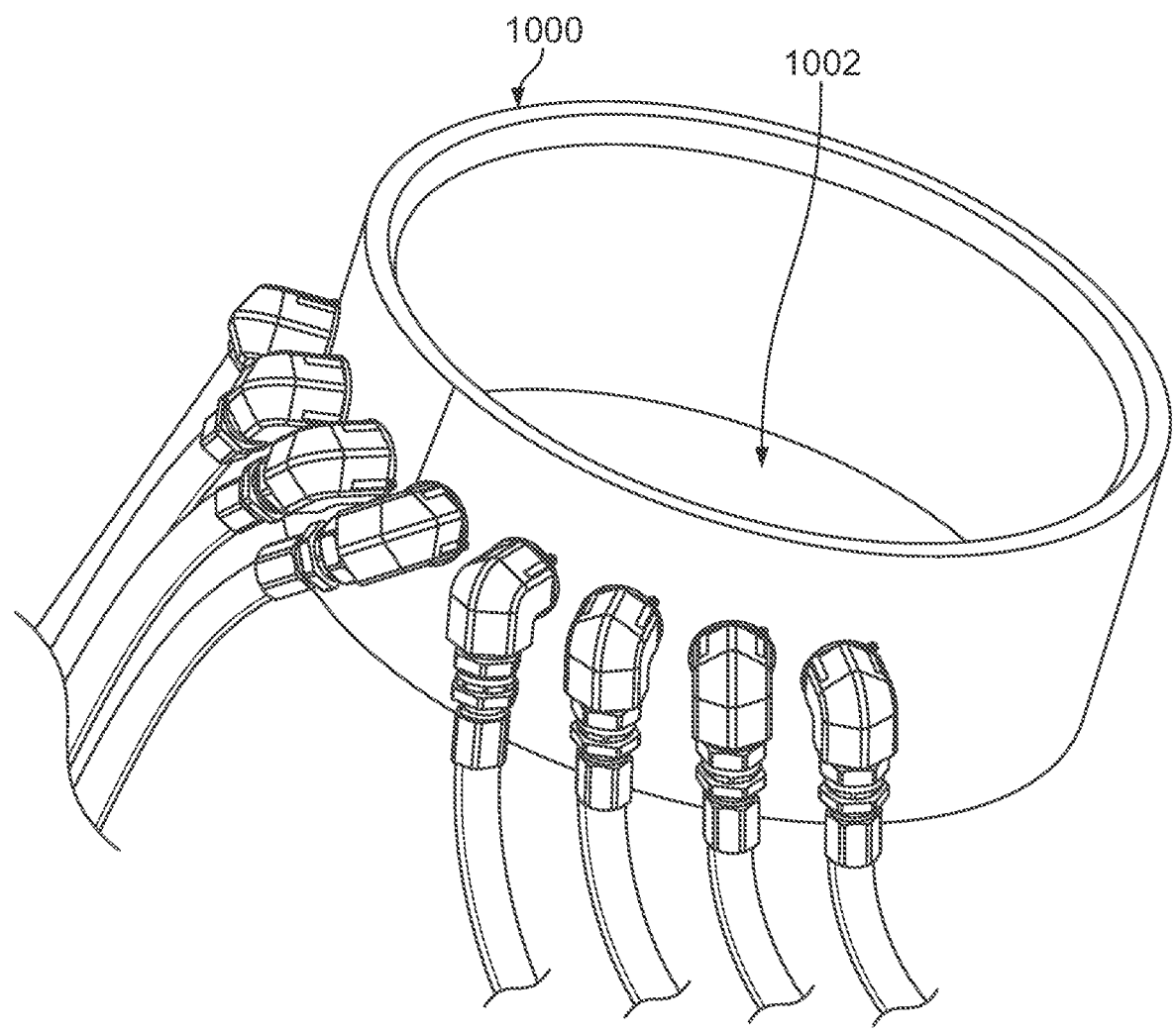
FIG. 12 illustrates multiple fluid lines coupled to a ring-shaped manifold, in accordance with an example implementation.

FIG. 11 illustrates multiple fluid lines coupled to a junction manifold 900, and FIG. 12 illustrates multiple fluid lines coupled to a ring-shaped manifold 1000, in accordance with example implementations. As shown in FIG. 11, the junction manifold 900 is configured as a rectangular prism block having at least four ports integrated or machined into the junction manifold 900. The four ports are configured similar to the port 104 described above, and are configured to receive four respective fittings 102A, 102B, 102C, and 102D each configured similar to the fitting 102 described above. The fittings 102A-102D can be oriented at different angles to receive respective fluid lines 902A, 902B, 902C, and 902D received from different directions. The junction manifold 900 can have internal fluid paths formed therein to direct flow receive from the fluid lines 902A-902D to respective outlet ports (not shown) and then to other components of a fluid system that comprises the junction manifold 900.

FIG. 12 depicts the ring-shaped manifold 1000 having multiple ports formed around a circumference of the ring-shaped manifold 1000. The ports are configured similar to the port 104 to receive respective fittings configured similar to the fitting 102.

The ring-shaped manifold 1000 is configured as a receptacle manifold defining an internal space 1002 configured to receive a male manifold (not shown). The male manifold can be configured to have respective inlet ports, and fluid paths formed therein to distribute fluid received through the fluid lines coupled to the ring-shaped manifold 1000 to other components of a fluid system.

The configuration of the fitting 102 as shown in FIGS. 1A-4 represents an example implementation. Several variations can be implemented while maintaining functionality and operation of the fitting 102 described above. For instance, rather than using the longitudinal groove 142 and the locking screw 146 to preclude hose kicking, other types of locking devices could be used. An example locking device can include flexible clamp arms with pre-attached rigid support plates. To lock an elbow fitting, for example, an installer can place the clamp arms around the legs of the elbow fitting and tightens a single securing screw to the recommended torque. As such, in most instances, no modification, realignment or disassembly of the fitting is involved.

As another example, instead of the spring 118 being a wave spring, a coil spring or nested coil springs could be used. Other types of springs could be used as described next.

Figure 13:
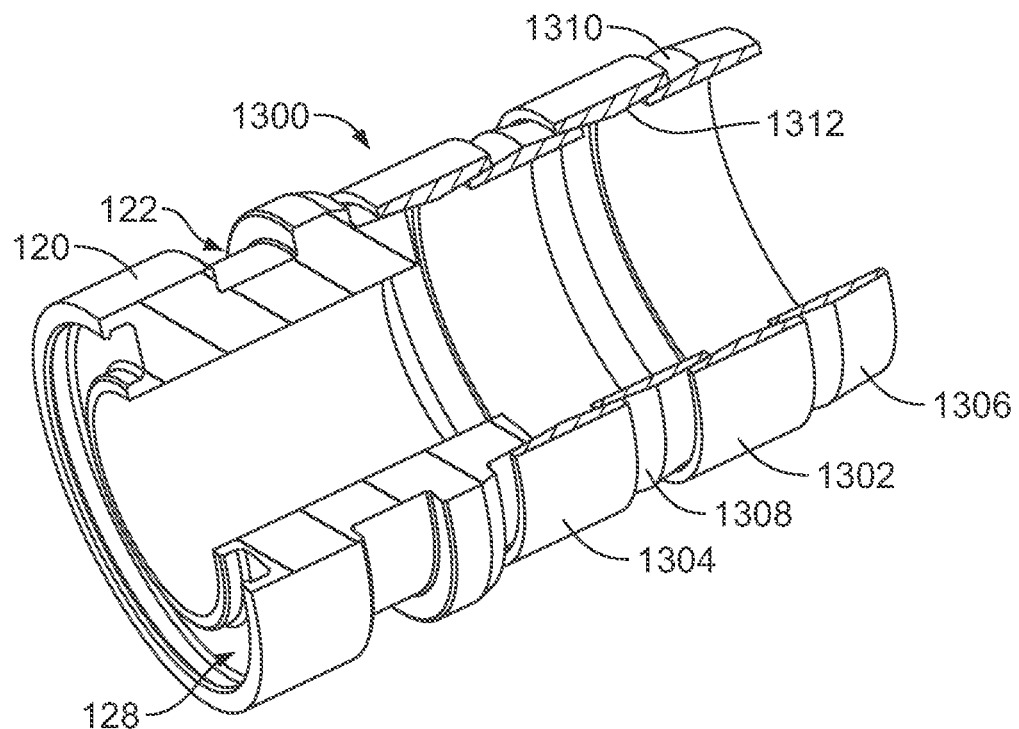
FIG. 13 illustrates a perspective partial cross-sectional view of a friction spring coupled to a seal carrier, in accordance with an example implementation.
Figure 14:
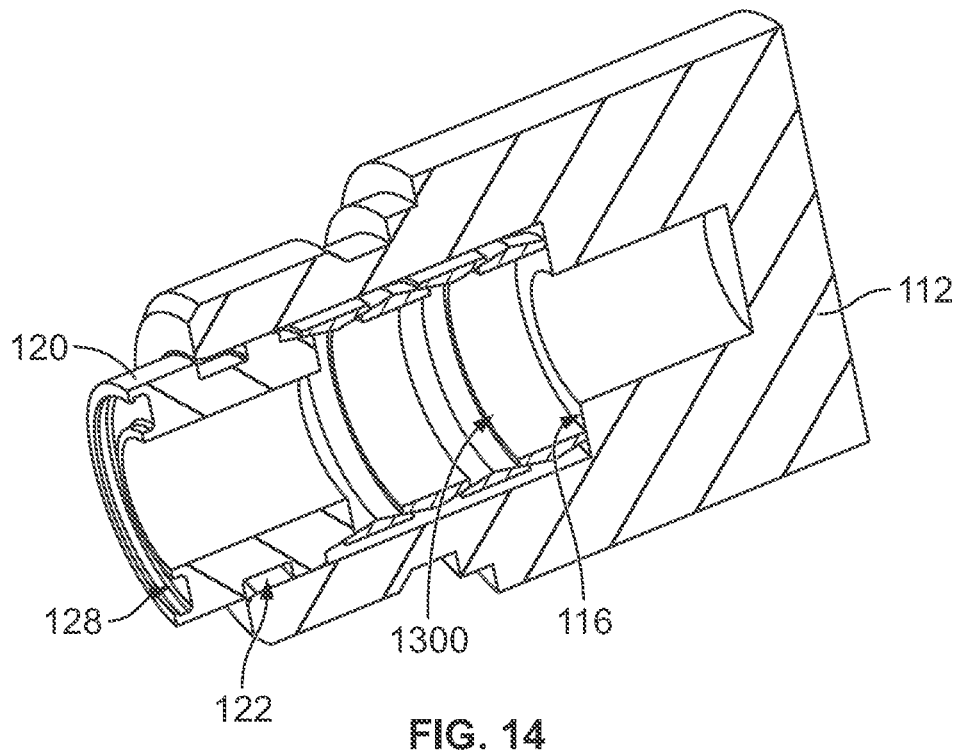
FIG. 14 illustrates a friction spring disposed within a fitting body, in accordance with an example implementation.

FIG. 13 illustrates a perspective partial cross-sectional view of a friction spring 1300 coupled to the seal carrier 120, and FIG. 14 illustrates the friction spring 1300 disposed within the fitting body 112, in accordance with an example implementation. The friction spring 1300 includes separate inner and outer mating tapered rings, which concentrically stack together to form a column of rings based to a desired spring rate. As an example for illustration, the friction spring 1300 can include a first outer ring 1302 and a second outer ring 1304 and can include a first inner ring 1306 and a second inner ring 1308.

The rings 1302-1308 are interleaving such that the outer ring 1302 is disposed between or mates with the inner rings 1306, 1308. The outer ring 1304 is disposed between the inner ring 1308 and the seal carrier 120. The inner ring 1306 is disposed between the outer ring 1302 and the annular shoulder 116 of the fitting body 112 as shown in FIG. 14. The friction spring 1300 can have more or fewer rings and can also have half rings in some example implementations.

The number of rings of the friction spring 1300 can determine the total travel or compression of the friction spring 1300 and the spring rate of the friction spring 1300, which affects the preload force that the friction spring 1300 applies to the seal carrier 120 to keep the seal carrier 120 pressed against the annular shoulder 136 of the port 104. The number of rings can be even or odd based on the size of the rings and the space available within the fitting body 112.

The selection of the size of the rings 1302-1308 can determine parameters of the friction spring 1300 such as the force that the friction spring 1300 applies on the seal carrier 120, length of the friction spring 1300, spring travel of the friction spring 1300, spring travel per ring, and amount of energy absorbed by the friction spring 1300 during operation. Each ring has a tapered face that frictionally interacts with a corresponding tapered face of a neighboring ring. For example, the inner ring 1306 has an exterior annular tapered face 1310 that interfaces and interacts with a corresponding interior annular tapered face 1312 of the outer ring 1302.

When an axial load is imposed on the friction spring 1300 due to pressurized fluid acting on the seal carrier 120, for example, the tapered faces slide against one another and the individual rings 1302-1308 are deformed elastically. As a result, the outer rings 1302, 1304 are stretched and the inner rings 1306, 1308 are compressed. The resulting spring travel is determined from the change in diameter of the elastically deformed rings and their angle of taper. The stress on the rings 1302-1308 generates the force that the friction spring 1300 applies to the seal carrier 120.

Referring to FIG. 14, the radial seal 124 can be positioned in the annular groove 122 of the seal carrier 120, and the friction spring 1300 and the seal carrier 120 are inserted into the fitting body 112. The friction of the radial seal 124 with the inner surface of the fitting body 112 operates to retain the friction spring 1300 and the seal carrier 120 within the fitting body 112. In examples, the rings 1302-1308 can be complete rings, and in other examples, one or more of the rings 1302-1308 can be a split ring.

Figure 15:
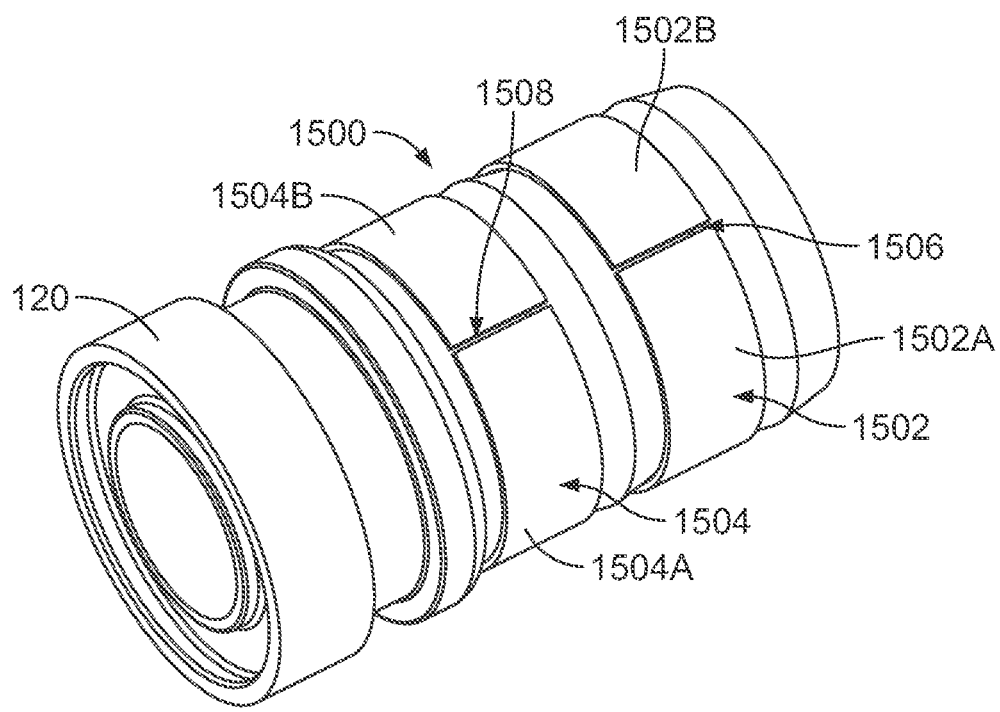
FIG. 15 illustrates a friction spring having split outer rings, in accordance with an example implementation.

FIG. 15 illustrates a friction spring 1500 having split outer rings 1502, 1504, in accordance with an example implementation. As shown in FIG. 15, the split outer ring 1502 is split into ring portion 1502A and ring portion 1502B with a gap 1506 therebetween. Similarly, the split outer ring 1504 is split into ring portion 1504A and ring portion 1504B with a gap 1508 therebetween. Configuration of the split outer rings 1502, 1504 can affect the force and deflection characteristics of the friction spring 1500.

Figure 16:
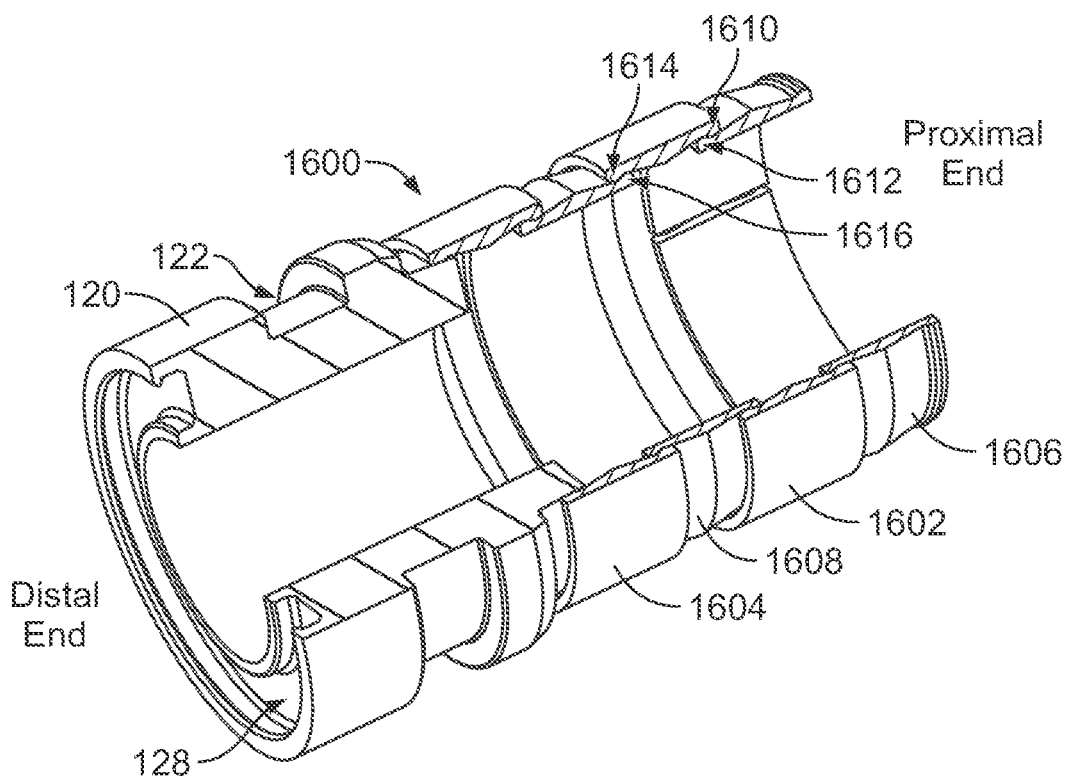
FIG. 16 illustrates a friction spring with an interlocking feature between rings of the friction spring, in accordance with an example implementation.

FIG. 16 illustrates a friction spring 1600 with an interlocking feature between rings of the friction spring 1600, in accordance with an example implementation. The friction spring 1600 is similar to the friction spring 1300 and has four rings including outer ring 1602, outer ring 1604, inner ring 1606, and inner ring 1608. To enhance retention and coupling of the rings to each other, each ring has protrusions at its ends that are configured to interact with corresponding protrusions of a neighboring ring to lock the rings to each other. Particularly, the outer rings 1602, 1604 have inward protrusions configured to interact with outward protrusions of the inner rings 1606, 1608.

For example, the outer ring 1602 has a proximal inward protrusion 1610 at a proximal edge of the outer ring 1602. The proximal inward protrusion 1610 of the outer ring 1602 is configured to interact with a distal outward protrusion 1612 at a respective edge (a distal edge) of the inner ring 1606. The outer ring 1602 further has a distal inward protrusion 1614 at a distal edge of the outer ring 1602. The distal inward protrusion 1614 of the outer ring 1602 is configured to interact with a proximal outward protrusion 1616 at a proximal edge of the inner ring 1608, and so on. With this configuration, if the fitting 102 is disassembled for any purpose, the friction spring 1600 can be retrieved from the fitting body 112 without the rings disassembling.

FIGS. 1A-4 and FIGS. 13-16 illustrate a spring (e.g., the spring 118 and the friction spring 1300, 1500, or 1600) as being a separate component from the seal carrier 120. In examples, the spring and the seal carrier can be made from a single component.

Figure 17:
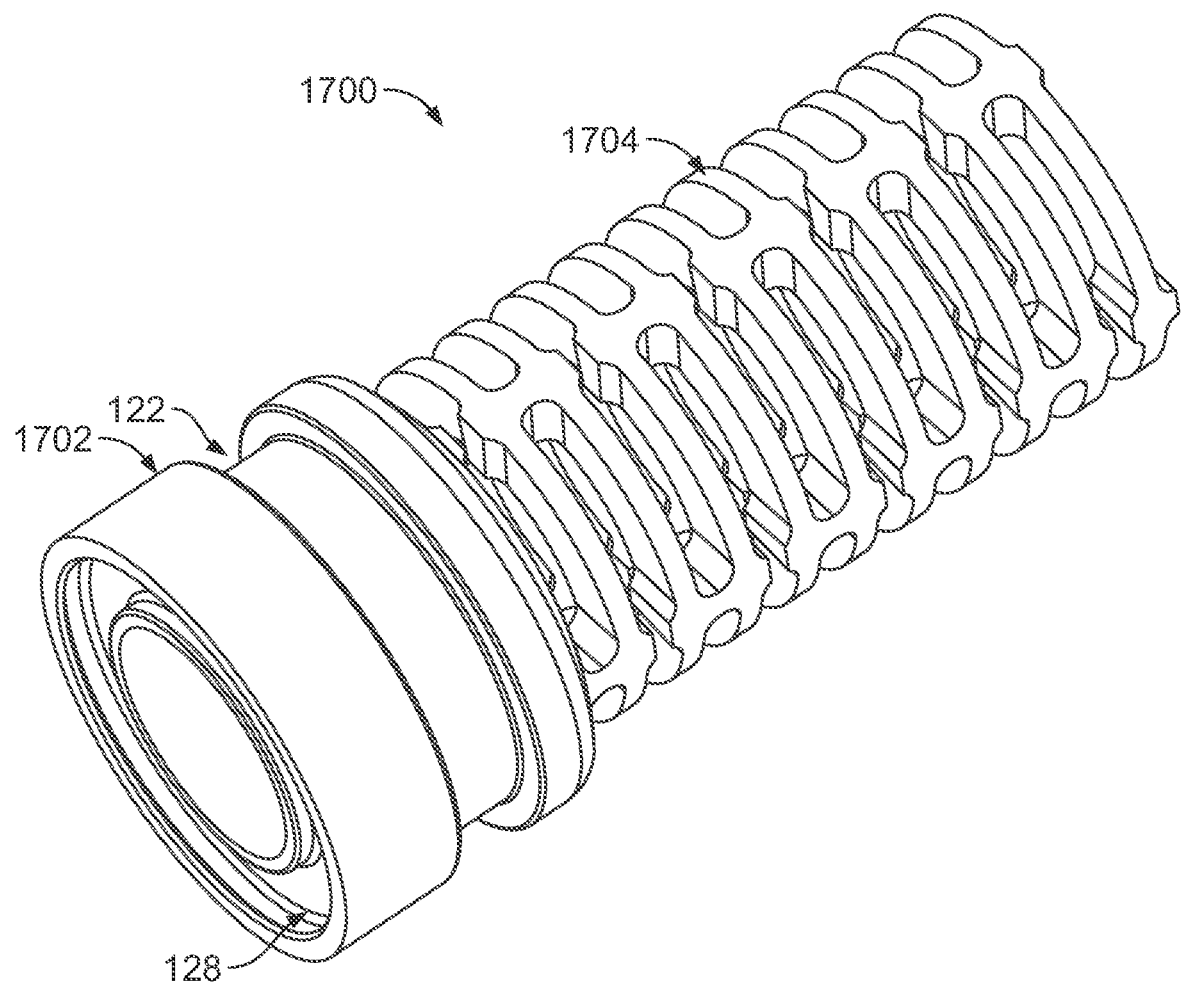
FIG. 17 illustrates a machined one-piece seal carrier and spring, in accordance with an example implementation.

FIG. 17 illustrates a machined one-piece seal carrier and spring 1700, in accordance with an example implementation. The one-piece seal carrier and spring 1700 can be machined to have a seal carrier portion 1702 and a spring portion 1704. The seal carrier portion 1702 is further machined to include the annular groove 122 and the annular groove 128. The spring portion 1704 is configured and machined to have spring coil-like portions that render spring-like characteristics to the spring portion 1704. In examples, the one-piece seal carrier and spring 1700 can be machined such that the spring portion 1704 can have rectangular coils with high aspect ratios, so as to tailor the performance characteristics of the spring portion 1704 to the operation of the fitting 102. Further, the spring portion 1704 can be machined with more than one starting point to maintain squareness under load and lateral force applied by pressurized fluid to the one-piece seal carrier and spring 1700.

Further, the one-piece seal carrier and spring 1700 can be machined to include features such as flanges, geometric shapes, or seats for interfacing with the annular shoulders 116, 136. Further, eliminating an additional step of assembling the seal carrier 120 to the spring can save time in handling, provide added reliability, ensure more accurate and linear spring rates, and facilitate achieving more precise dimensions.

The detailed description above describes various features and operations of the disclosed systems, assemblies, components, and methods with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A fitting comprising:
a fitting body having counterbore formed therein, wherein the counterbore defines an annular shoulder within the fitting body;
a spring having a first end interfacing with the annular shoulder of the counterbore; and
a seal carrier having: (i) a first end face interfacing with a second end of the spring, (ii) a second end face configured to interface with an internal surface of a port, such that the spring is configured to apply a biasing force on the seal carrier toward the internal surface of the port, (iii) a first annular groove on an exterior peripheral surface of the seal carrier, wherein the first annular groove is configured to have a radial seal disposed therein, and (iv) a second annular groove in the second end face, wherein the second annular groove is configured to have a face seal disposed therein, wherein the spring and the seal carrier are made as a one-piece seal carrier and spring having a spring portion operating as the spring and a seal carrier portion operating as the seal carrier.

2. The fitting of claim 1, wherein the fitting has a respective first end configured to be coupled to a fluid line and a respective second end configured to be coupled to the port, wherein the fitting body defines therein a fluid passage that fluidly couples the first end to the second end of the fitting.

3. The fitting of claim 1, wherein the fitting body includes external threads disposed on a respective exterior peripheral surface of the fitting body and configured to engage with internal threads of the port to couple the fitting body to the port.

4. The fitting of claim 1, wherein the fitting body further includes an annular groove disposed on a respective exterior peripheral surface of the fitting body, wherein the annular groove is configured to receive an ingression seal to be disposed between the fitting body and the port so as to preclude leakage from an external environment of the fitting body to within the fitting body.

5. An assembly comprising:
a port integrated into a manifold or a fluid line, the port comprising a port body, wherein the port body has first counterbore formed therein, wherein the first counterbore defines a first annular shoulder within the port body, and wherein the port body includes internal threads disposed on an interior peripheral surface of the port body; and
a fitting comprising:
a fitting body having a second counterbore formed therein, wherein the second counterbore defines a second annular shoulder within the fitting body, wherein the fitting body includes external threads disposed on an exterior peripheral surface of the fitting body configured to threadedly engage the internal threads of the port body to couple the fitting to the port;
a spring having a first end interfacing with the second annular shoulder of the second counterbore; and
a seal carrier having: (i) a first end face interfacing with a second end of the spring, (ii) a second end face configured to interface with the first annular shoulder of the port body, such that the spring is configured to apply a biasing force on the seal carrier toward the first annular shoulder of the port body, (iii) a first annular groove on a respective exterior peripheral surface of the seal carrier, wherein the first annular groove includes a radial seal disposed therein between the seal carrier and a respective interior peripheral surface of the fitting body, and (iv) a second annular groove in the second end face, wherein the second annular groove includes a face seal disposed therein between the second end face of the seal carrier and the first annular shoulder of the port body, such that the face seal contacts, and seals against, the first annular shoulder of the port body, wherein the port couples the fitting to the manifold or the fluid line.

6. The assembly of claim 5, wherein the fitting has a respective first end configured to be coupled to a fluid line and a respective second end coupled to the port, wherein the fitting body defines therein a fluid passage that fluidly couples the first end to the second end of the fitting.

7. The assembly of claim 5, wherein the fitting body further includes an annular groove disposed on the exterior peripheral surface of the fitting body, wherein the annular groove includes an ingression seal disposed between the fitting body and the port so as to preclude leakage from an external environment of the fitting body to within the fitting body.

8. The assembly of claim 5, wherein the spring and the seal carrier are made as a machined one-piece seal carrier and spring having a spring portion operating as the spring and a seal carrier portion operating as the seal carrier.

9. The assembly of claim 5, wherein the spring is configured as a friction spring comprising one or more inner rings mating with one or more outer rings, such that each outer ring has an interior annular tapered face interfacing with an exterior annular tapered face of an inner ring.

10. The assembly of claim 9, wherein each inner ring has an outward protrusion at an edge of the inner ring configured to interact with an inward protrusion at a respective edge of a mating outer ring.

11. The assembly of claim 9, wherein at least one of the outer rings is configured as a split ring.

12. The assembly of claim 5, wherein the fitting body includes a longitudinal groove disposed on the exterior peripheral surface of the fitting body, wherein the port body includes a hole configured to receive a locking screw, such that a head of the locking screw is disposed partially within the longitudinal groove of the fitting body to preclude rotation of the fitting body relative to the port body when the fitting is coupled to the port.

13. A fluid system comprising:
 a manifold having a port comprising a first counterbore formed therein, wherein the first counterbore defines a first annular shoulder within the port, and wherein the port includes internal threads disposed on an interior peripheral surface of the port;
 a fluid line; and
 a fitting having a first end coupled to the fluid line and a second end coupled to the port, such that fitting fluidly couples the fluid line to the manifold, wherein the fitting comprises:
  a fitting body having a second counterbore formed therein, wherein the second counterbore defines a second annular shoulder within the fitting body, wherein the fitting body includes external threads disposed on an exterior peripheral surface of the fitting body configured to threadedly engage the internal threads of the port to couple the fitting to the port;
  a spring having a first end interfacing with the second annular shoulder of the second counterbore; and
  a seal carrier having: (i) a first end face interfacing with a second end of the spring, (ii) a second end face configured to interface with the first annular shoulder of the port, such that the spring is configured to apply a biasing force on the seal carrier toward the first annular shoulder of the port, (iii) a first annular groove on a respective exterior peripheral surface of the seal carrier, wherein the first annular groove includes a radial seal disposed therein between the seal carrier and a respective interior peripheral surface of the fitting body, and (iv) a second annular groove in the second end face, wherein the second annular groove includes a face seal disposed therein between the second end face of the seal carrier and the first annular shoulder of the port.

14. The fluid system of claim 13, wherein the fitting body further includes an annular groove disposed on the exterior peripheral surface of the fitting body, wherein the annular groove includes an ingression seal disposed between the fitting body and the port so as to preclude leakage from an external environment of the fitting body to within the fitting body.

15. The fluid system of claim 13, wherein the spring and the seal carrier are made as a machined one-piece seal carrier and spring having a spring portion operating as the spring and a seal carrier portion operating as the seal carrier.

16. The fluid system of claim 13, wherein the spring is configured as a friction spring comprising one or more inner rings mating with one or more outer rings, such that each outer ring has an interior annular tapered face interfacing with an exterior annular tapered face of an inner ring.

* * * * *